United States Patent [19]
Wada et al.

[11] 3,950,278
[45] Apr. 13, 1976

[54] PROCESS FOR PRODUCING A CROSSLINKED FOAM OF POLYOLEFIN RESIN HAVING OPEN CELLS

[75] Inventors: Motomu Wada, Nagaokakyo; Kaoru Kitadono, Takatsuki; Akira Oishi, Nara, all of Japan

[73] Assignee: Sumitomo Chemical Company, Limited, Osaka, Japan

[22] Filed: May 28, 1974

[21] Appl. No.: 473,831

[30] Foreign Application Priority Data
May 31, 1973 Japan................................ 48-61527

[52] U.S. Cl...... 260/2.5 HA; 260/2.5 E; 260/42.43; 260/897 A; 260/897 B
[51] Int. Cl.².......................... C08J 9/08; C08J 9/10
[58] Field of Search.................. 260/897 A, 2.5 HA

[56] References Cited
UNITED STATES PATENTS

| | | | |
|---|---|---|---|
| 3,098,831 | 7/1963 | Carr | 260/2.5 HA |
| 3,341,481 | 9/1967 | Palmer | 260/2.5 HA |
| 3,370,106 | 2/1968 | Hall, Jr. et al. | 260/897 A |
| 3,592,785 | 7/1971 | Patterson | 260/2.5 HA |
| 3,644,230 | 2/1972 | Cronin | 260/2.5 E |
| 3,645,930 | 2/1972 | Normanton | 260/2.5 HA |
| 3,651,183 | 3/1972 | Hosoda et al. | 260/2.5 HA |
| 3,709,806 | 1/1973 | Minami | 260/2.5 H |

FOREIGN PATENTS OR APPLICATIONS

| | | | |
|---|---|---|---|
| 927,881 | 6/1963 | United Kingdom | 260/897 R |
| 1,136,115 | 12/1968 | United Kingdom | 260/897 R |

*Primary Examiner*—Morton Foelak
*Attorney, Agent, or Firm*—Stevens, Davis, Miller & Mosher

[57] ABSTRACT

A process for producing a crosslinked foam having uniform, fine, open cells, which comprises foaming an expandable composition comprising a crosslinkable polyolefin resin, 20 to 60 % by weight of an amorphous propylene polymer, a foaming agent and a crosslinking agent, by a one-step heat-press method. According to said process, a crosslinked foam having an open cell percentage of 40% or more can be obtained by a one-step treatment.

7 Claims, No Drawings

PROCESS FOR PRODUCING A CROSSLINKED FOAM OF POLYOLEFIN RESIN HAVING OPEN CELLS

The present invention relates to a process for producing a crosslinked foam of a polyolefin resin having uniform, fine, open cells by foaming an expandable composition comprising a polyolefin resin, an amorphous propylene polymer, a foaming agent and a crosslinking agent, by means of a one-step heat-press method.

Heretofore, the crosslinked foam of a polyolefin obtained according to a usual method has had a closed cell percentage of 80% or more. In order to obtain open cells, in general, a crosslinked foam has first been prepared and the resulting product has then been subjected to a secondary processing to destroy the closed cells for conversion to open cells. As described in, for example, Japanese Patent Publication No. 31695/1972, there is a process which comprises cooling a crosslinked foam of a synthetic resin at a temperature below the glass transition temperature of the resin, and thereafter compressing the foam to destroy the closed cells, thereby forming open cells. This process, however, has two steps and requires apparatus to destroy the closed cells. Other processes for obtaining open cells include a process for foaming a resin in an uncrosslinked state. According to this process, however, the cells formed are coarse and non-uniform, and also it is difficult to mold a foam having an expansion ratio of three or more.

The term "closed cells" used herein means cells in which bubbles are surrounded by resin membranes in the foam and are not interconnected to open to the external of the foam. The term "open cells" means cells interconnected to open to the external of the foam. The respective percentages of these two types of cells are determined by the following equations after measuring the real volume ($\Delta V$) of a test specimen of a foam by an air substitution method.

$$\text{Closed cell percentage (Vol. \%)} = \frac{\Delta V - Ws/dp}{Vs} \times 100$$

$$\text{Open cell percentage (Vol.\%)} = \frac{Vs - \Delta V}{Vs} \times 100$$

Vs: The apparent volume of the test specimen
Ws: The weight of the test specimen
$\Delta V$: The real volume of the test specimen
dp: The density of the plastic material constituting specimen After extensive research on a process for producing a crosslinked foam having open cells by a one-step heat-press method, the present inventors have confirmed that a crosslinked foam having open cells obtained by blending an amorphous propylene polymer with a crosslinkable polyolefin resin and crosslinking and foaming the mixture, is advantageous in processability and economy.

An object of the present invention is to provide a process for producing a crosslinked foam having open cells.

Another object of the present invention is to provide a process for producing a crosslinked foam having open cells by a one-step heat-press method.

The other objects and advantages of the present invention will be apparent from the following description.

According to this invention, there is provided a process for producing a crosslinked foam having open cells in a proportion of at least 40%, preferably 70% to 90% as defined hereinbefore by blending a crosslinking agent and a foaming agent with an ethylene polymer, heating the resulting mixture under pressure and then relieving the pressure, characterized in that 20 to 60%, preferably 30 to 50%, by weight, based on the weight of the total resin components, of an uncrosslinkable, amorphous propylene polymer is blended with the crosslinkable ethylene polymer.

When the mixture of the crosslinkable ethylene polymer and the uncrosslinkable amorphous propylene polymer is heated under pressure, only the crosslinkable ethylene polymer is crosslinked, while leaving the uncrosslinkable propylene polymer uncrosslinked, whereby a foam having an open cell percentage of at least 40% is obtained. In this case, when the amount of the uncrosslinkable amorphous propylene polymer is less than 20% by weight, the open cell percentage of the resulting foam is too low, and when the amount of the propylene polymer is more than 60% by weight, the crosslinking becomes insufficient, and hence, no satisfactory foam is obtained.

The crosslinkable ethylene polymer of this invention includes general purpose low-density polyethylene, high-density polyethylene and ethylene copolymers such as ethylene-vinyl acetate copolymer having a vinyl acetate content of 40% by weight or less and the like. The amorphous propylene polymer includes substantially amorphous propylene polymers having an intrinsic viscosity of 0.3 to 0.6 dl/g as measured at 135°C in tetralin obtained as a by-product at the time of production of a general purpose propylene polymer resin. These amorphous propylene polymers include the homopolymer of propylene and the copolymer of propylene with ethylene having an ethylene content of 10% by weight or less.

The foaming agent includes chemical foaming agents which generate such an inert gas as nitrogen by thermal decomposition. Azo compounds, such as azodicarbonamide; nitroso compounds, such as N,N'-dinitrosopentamethylenetetramine; and aromatic hydrazides, such as p,p'-oxybenzenesulfonyl hydrazide may generally be used as the foaming agent. The amount of the foaming agent may be varied depending upon the desired expansion ratio, though the foaming agent is preferably used in amount of 1 to 20 parts by weight per 100 parts by weight of the total of the crosslinkable ethylene polymer and the amorphous propylene polymer (the total resin components).

In order to lower the decomposition temperature of the foaming agent, a foaming adjuvant, such as zinc stearate, may be used in a proportion of 5 or less parts by weight per 100 parts by weight of the total resin components.

The crosslinking agent is an organic peroxide which can thermally be decomposed thereby crosslinking the ethylene polymer, the temperature for its half value period of 10 hrs. being about the blending temperature and the temperature for its half-value period of 1 min being about the thermal decomposition temperature of the foaming agent. Examples of the crosslinking agent are dicumyl peroxide, 1,3-di-tert-butylperoxyisopropylbenzene and the like. The proportion of the crosslinking agent is preferably 1 to 4 parts by weight per 100 parts by weight of the total resin components.

Moreover, coloring agents and/or fillers may appropriately be blended with the above composition.

In this invention, the above components are blended uniformly at low temperatures, the resulting mixture is placed in a mold, and heated under pressure for a given period of time, after which the pressure is relieved to freely expand the mixture outside the mold. When the crosslinkable ethylene polymer is an ethylene-vinyl acetate copolymer, the above components are milled on rolls heated at 100°C for 10 min to form a sheet material, after which the sheet material is placed in the predetermined amount in a mold, heated at 170°C under pressure for 15 min, and the pressure is relieved to obtain a foam.

This invention is further illustrated below in detail with reference to Examples, but the invention is not limited to the Examples.

EXAMPLE 1

Blending composition

| | |
|---|---|
| Ethylene vinyl acetate copolymer (vinyl acetate content: 15% by weight; melt index: 1.5 g/10 min) | 4,000 g |
| Ethylene-propylene copolymer (ethylene content: 5% by weight; intrinsic viscosity in tetralin at 135°C: 0.4 dl/g) | 5,000 g |
| Azodicarbonamide | 177 g |
| Zinc stearate | 88 g |
| 1,3-Di-tert-butylperoxyisopropylbenzene | 88 g |
| Light, fine calcium carbonate | 647 g |

The above composition was roll-milled at 100°C for 10 min, placed in a foaming mold having a dimension of 200 mm × 200 mm × 10 mm, and then heated at 170°C under a pressure of 190 kg/cm² for 15 min, after which the pressure was relieved to foam the composition.

The resulting foam had an open cell percentage of 80% and a foaming ratio of 7.5 times.

The open cell percentage was determined by the aforesaid equation after measuring the real volume of the foam by means of an air comparison pycnometer Model 930 produced by Toshiba-Beckman Co., Ltd.

For comparison, a case where the amorphous polypropylene is not used is given below.

Blending composition

| | |
|---|---|
| The same ethylene-vinyl acetate copolymer as above | 8,000 g |
| Azodicarbonamide | 177 g |
| Zinc stearate | 88 g |
| 1,3-Di-tert-butylperoxyisopropylbenzene | 88 g |
| Light, fine calcium carbonate | 1,647 g |

In the same manner as in Example 1, the above composition was roll-milled and heated under pressure, after which the pressure was relieved to foam the composition.

The resulting foam had an open cell percentage of 15% and a foaming ratio of 7.0 times.

EXAMPLE 2

Blending composition

| | |
|---|---|
| Polyethylene (density: 0.921 g/cm³; melt index: 2 g/10 min) | 5,000 g |
| The same ethylene-propylene copolymer as in Example 1 | 3,500 g |
| Azodicarbonamide | 177 g |
| Zinc stearate | 88 g |
| Dicumyl peroxide | 88 g |
| Light, fine calcium carbonate | 1,147 g |

The above composition was treated in the same manner as in Example 1 to obtain a foam having an open cell percentage of 90% and a foaming ratio of 8.0 times.

EXAMPLE 3

Blending composition

| | |
|---|---|
| The same ethylene-vinyl acetate copolymer as in Example 1 | 7,500 g |
| Polypropylene (intrinsic viscosity in tetralin at 135°C: 0.5 dl/g) | 2,500 g |
| Azodicarbonamide | 200 g |
| Zinc stearate | 100 g |
| 1,3-Di-tert-butylperoxyisopropylbenzene | 100 g |

The above composition was treated in the same manner as in Example 1 to obtain a foam having an open cell percentage of 45% and a foaming ratio of 7.0 times.

What is claimed is:

1. A process for producing a crosslinked foam having uniform, fine, open cells in a proportion of at least 40% in terms of open cell percentage defined hereinbefore comprising mixing an ethylene polymer selected from the group consisting of general purpose low density polyethylene, high density polyethylene and an ethylene-vinyl acetate copolymer having a vinyl acetate content of no more than 40% by weight, an organic peroxide and a foaming agent, heating the resulting mixture under pressure and then relieving the pressure, characterized in that an amorphous propylene polymer having an intrinsic viscosity of 0.3 to 0.6 dl/g as measured in tetralin at 135°C and obtained as a by-product at the time of production of a general purpose polypropylene is mixed with said ethylene polymer in a proportion of 20 to 60% by weight based on the weight of total resin components.

2. A process according to claim 1, wherein the proportion of the amorphous propylene polymer is 30 to 50% by weight based on the weight of the total resin components.

3. A process according to claim 1, wherein the amorphous propylene polymer is substantially amorphous homopolymer of propylene or substantially amorphous copolymer of propylene and ethylene.

4. A process according to claim 3, wherein the propylene-ethylene copolymer has an ethylene content of 10% by weight or less.

5. A process according to claim 1, wherein the foaming agent is a chemical foaming agent which generates an inert gas by thermal decomposition.

6. A process according to claim 5, wherein the chemical foaming agent is an azo compound, a nitroso compound or an aromatic hydrazide.

7. A process according to claim 1, wherein the organic peroxide is dicumyl peroxide or 1,3-di-tert-butylperoxyisopropylbenzene.

* * * * *